US007162914B2

(12) United States Patent
Streib et al.

(10) Patent No.: US 7,162,914 B2
(45) Date of Patent: Jan. 16, 2007

(54) METHOD AND CONTROL UNIT FOR FUNCTION DIAGNOSIS OF A FUEL-TANK VENTING VALVE OF A FUEL TANK SYSTEM IN A MOTOR VEHICLE IN PARTICULAR

(75) Inventors: Martin Streib, Vaihingen (DE); Dieter Lederer, Ludwigsburg (DE); Karl-Bernhard Lederle, Renningen (DE)

(73) Assignee: Robert Bosch GmbH, Stuttgart (DE)

( * ) Notice: Subject to any disclaimer, the term of this patent is extended or adjusted under 35 U.S.C. 154(b) by 121 days.

(21) Appl. No.: 10/484,974

(22) PCT Filed: Jun. 21, 2002

(86) PCT No.: PCT/DE02/02297

§ 371 (c)(1),
(2), (4) Date: Sep. 13, 2004

(87) PCT Pub. No.: WO03/012278

PCT Pub. Date: Feb. 13, 2003

(65) Prior Publication Data

US 2005/0034513 A1 Feb. 17, 2005

(30) Foreign Application Priority Data

Jul. 25, 2001 (DE) ................................ 101 36 183

(51) Int. Cl.
*G01M 3/04* (2006.01)

(52) U.S. Cl. ........................................................ 73/49.7

(58) Field of Classification Search ................. 73/49.2, 73/49.7; 123/520
See application file for complete search history.

(56) References Cited

U.S. PATENT DOCUMENTS 5,273,020 A * 12/1993 Hayami ...................... 123/520
5,347,971 A 9/1994 Kobayashi et al.
5,349,935 A 9/1994 Mezger et al.
5,685,279 A * 11/1997 Blomquist et al. .......... 123/520
5,794,599 A 8/1998 Blumenstock
5,817,925 A * 10/1998 Cook et al. ..................... 73/40
5,890,474 A * 4/1999 Schnaibel et al. .......... 123/520
5,898,103 A 4/1999 Denz et al.
6,131,550 A * 10/2000 Fritz et al. .................. 123/520
6,250,288 B1 * 6/2001 Fritz .......................... 123/520

(Continued)

FOREIGN PATENT DOCUMENTS

DE 44 01 887 8/1994

(Continued)

*Primary Examiner*—Hezron Williams
*Assistant Examiner*—John Fitzgerald
(74) *Attorney, Agent, or Firm*—Kenyon & Kenyon LLP

(57) ABSTRACT

In a method for testing the functional reliability of a fuel-tank venting valve which is provided in a tank system of a motor vehicle in particular, is connected to an intake manifold and is triggerable by a control unit, a pressure source is provided for testing the tank system for leaks by using excess pressure or a vacuum, and the test of the functional reliability of the fuel-tank venting valve is performed on the basis of at least one performance quantity of the pressure source. In order to achieve a short diagnostic time and a high degree of diagnostic certainty, the fuel-tank venting valve is triggered to open or close, and a certain change in pressure is implemented. The at least one performance quantity of the pressure source is detected, and a properly opening and closing fuel-tank venting valve is determined from the performance quantity thus detected.

10 Claims, 3 Drawing Sheets

U.S. PATENT DOCUMENTS

| | | | | |
|---|---|---|---|---|
| 6,446,492 | B1 * | 9/2002 | Weldon et al. | 73/49.2 |
| 6,446,615 | B1 * | 9/2002 | Stegmann et al. | 123/520 |
| 6,460,518 | B1 * | 10/2002 | Streib | 123/520 |
| 6,550,315 | B1 * | 4/2003 | Streib | 73/49.7 |
| 6,615,808 | B1 * | 9/2003 | Streib | 123/520 |
| 6,644,100 | B1 * | 11/2003 | Fritz et al. | 73/49.7 |
| 6,679,111 | B1 * | 1/2004 | Shigihama et al. | 73/118.1 |
| 6,820,467 | B1 * | 11/2004 | Streib | 73/49.2 |
| 6,887,284 | B1 * | 5/2005 | Hudson | 44/629 |
| 6,889,667 | B1 * | 5/2005 | Fritz et al. | 123/520 |
| 6,959,587 | B1 * | 11/2005 | Schulz et al. | 73/49.7 |
| 6,993,957 | B1 * | 2/2006 | Kano et al. | 73/49.7 |

FOREIGN PATENT DOCUMENTS

| | | |
|---|---|---|
| DE | 196 25 702 | 1/1998 |
| DE | 196 36 431 | 3/1998 |
| DE | 198 09 384 | 9/1999 |
| DE | 100 06 186 | 6/2001 |
| DE | 100 43 071 | 3/2002 |
| DE | 39 09 887 | 2/2003 |
| FR | 2 731 467 | 9/1996 |
| JP | 6173837 | 6/1994 |

* cited by examiner

METHOD AND CONTROL UNIT FOR FUNCTION DIAGNOSIS OF A FUEL-TANK VENTING VALVE OF A FUEL TANK SYSTEM IN A MOTOR VEHICLE IN PARTICULAR

FIELD OF THE INVENTION

The present invention relates to a method and control unit for testing the functional reliability of a fuel-tank venting valve provided in a fuel tank system of a motor vehicle.

BACKGROUND

Conventionally, modern internal combustion engines used in motor vehicles have a fuel supply tank and a checking device for monitoring and, if necessary, preventing the emission of fuel vapors formed in the fuel supply tank. The checking device in particular captures any fuel vapor that occurs via an activated carbon trap, i.e., an activated carbon filter, and stores it temporarily in the activated carbon trap. Volatile fuel vapors, i.e., usually hydrocarbon vapors, are formed, for example, during the operation of filling the tank of the vehicle or because of a rise in the fuel temperature in the tank and the associated rise in the fuel vapor pressure.

The storage capacity of the activated carbon trap declines steadily with an increasing amount of stored hydrocarbon and therefore the activated carbon trap must be regenerated occasionally, i.e., the stored hydrocarbon must be dissolved back out of it. To this end, the activated carbon trap is connected to the internal combustion engine via a fuel-tank venting valve (TEV) having an intake manifold which is used to draw in combustion air via a throttle valve. Opening the fuel-tank venting valve results in a pressure gradient between the activated carbon trap and the intake manifold by which the hydrocarbon stored in the activated carbon trap is sent to the intake manifold to ultimately be burned in the internal combustion engine and thus eliminated.

In the present context, reference is made to the statutory regulations concerning the operation of internal combustion engines, which have been made more stringent in some countries such as the United States; according to these regulations, motor vehicles using volatile fuels such as gasoline must have a checking device as mentioned in the preamble capable of detecting any leakage through an opening 0.5 mm in size in the tank or throughout the entire fuel tank system, using only onboard means.

This regeneration of the activated carbon trap depends in a sensitive manner on the functioning of the fuel-tank venting valve. There is thus a requirement that the fuel-tank venting valve must be checked regularly for proper functioning. A conventional approach for diagnosing the fuel-tank venting valve involves operating the fuel-tank venting valve at a sufficiently stable operating point when idling and observing the change in the composition of the mixture supplied to the internal combustion engine as well as the change in the energy flow through the throttle valve. This energy flow corresponds to the product of the air mass flow removed through the throttle valve and the firing angle efficiency. Therefore, this method presupposes a high intake manifold vacuum.

According to another conventional approach, the diagnosis is performed as part of a conventional leakage test on the tank system. Such a method is described in U.S. Pat. Nos. 5,349,935, 5,890,474, 6,131,550, and 5,898,103, and German Patent Application Nos. DE 196 36 431.0, DE 198 09 384.5 and DE 196 25 702, for example. In these patents, the tank system is acted upon by an excess pressure via a pump and, if applicable, the presence of a leak is determined by subsequent analysis of the pressure variation. Moreover, similar methods are described in Japanese Patent No. 6173837 and U.S. Pat. No. 5,347,971, in which a reference leak is connected in parallel to the tank system, and in which a conclusion is drawn regarding the presence of a leak by comparing the measurements with and without the reference leak. In addition, U.S. Pat. No. 5,890,474 and German Patent Application No. 196 36 431.0 describes that a performance quantity of the pump, e.g., the electric power consumption, may be used in the leakage test. For a function diagnosis of the fuel-tank venting valve, first a check is usually performed on the basis of the reference leak method described above to determine whether the tank system is tight. Assuming the tank is tight, the fuel-tank venting valve is triggered to open. Then if there is a significant drop in the pump's power consumption, the fuel-tank venting valve is assumed to be functioning properly.

These procedures for the function diagnosis of the fuel-tank venting valve require time-consuming measurements and do not allow a quantitative statement with regard to proper functioning of the fuel-tank venting valve.

SUMMARY

An object of the present invention is therefore to improve upon a method and a control unit so that the greatest possible measure of diagnostic reliability is achieved within the shortest possible diagnostic time.

According to the present invention, the fuel-tank venting valve is triggered to open or close, a certain change in pressure is implemented, at least one performance quantity of the pressure source is thereby detected, and a properly opening and closing fuel-tank venting valve is determined from the performance quantity thus detected.

In an embodiment, the fuel-tank venting valve is triggered to close, and a certain pressure buildup in the fuel-tank venting system is generated by the pressure source. The at least one performance quantity of the pressure source is detected, and a properly closing fuel-tank venting valve is determined from the performance quantity thus detected, if necessary. To also be able to determine whether a fuel-tank venting valve is opening properly accordingly, the fuel-tank venting valve is subsequently triggered to open and during the resulting pressure drop the at least one performance quantity of the pressure source is detected.

Alternatively, the fuel-tank venting valve may be triggered to open, whereupon there is a pressure drop in the fuel-tank venting system and the at least one performance quantity of the pressure source is detected, and a properly opening fuel-tank venting valve is determined from the performance quantity thus detected; the fuel-tank venting valve is subsequently triggered to close and with the resulting pressure buildup the at least one performance quantity of the pressure source is detected, and a properly closing fuel-tank venting valve is determined from the performance quantity thus detected, if necessary.

According to a second embodiment, the fuel-tank venting valve is triggered to close and the pressure source is at first activated briefly. An idle performance quantity of the pressure source is then detected. Next the fuel-tank venting valve is triggered to open and, if necessary, the functional reliability of the fuel-tank venting valve is determined from the relative change in the at least one performance quantity of the pressure source with respect to the idle performance quantity.

The method according to the present invention may also be used with systems having only a slight intake manifold vacuum, e.g., VVT systems. This method does not require pumping upstream from the actual fuel-tank venting valve diagnosis against a reference leak and a subsequent buildup of pressure until reaching a reference flow level. However, this provides a considerably shortened fuel-tank venting valve diagnostic time and also greater certainty of the result. According to one example embodiment, a quantitative statement regarding the actual volume flow performance of the fuel-tank venting valve is also made possible.

The present invention may be used to advantage not only in automotive engineering but also in all fields in which tank systems are to be kept free of volatile substances. The petrochemical field is described herein as an example.

BRIEF DESCRIPTION OF THE DRAWINGS

The present invention is described below on the basis of exemplary embodiments from which additional features and advantages of the present invention are derived.

DETAILED DESCRIPTION

Figure 1:
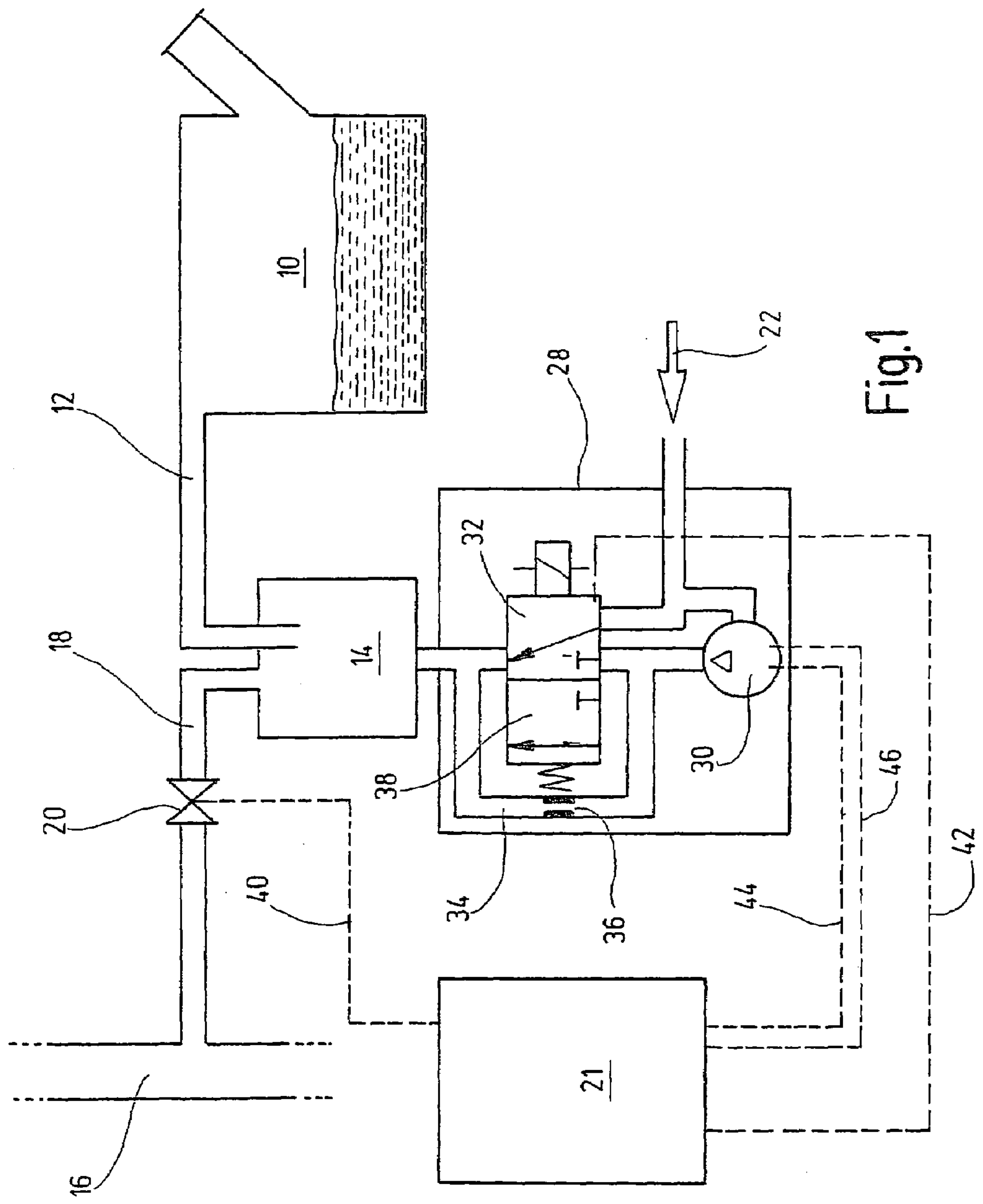
FIG. 1 shows a fuel tank system in which a method making use of the present invention and a control unit according to the present invention are used.

The fuel tank system shown in block diagram form in FIG. 1 includes a tank 10, which is connected via a tank connecting line 12 to an activated carbon filter 14. An intake manifold 16 having a throttle valve (not shown) in an internal combustion engine (also not shown) is also connected to tank 10 via an intake line 18 (likewise via activated carbon filter 14) and a fuel-tank venting valve (TEV) 20.

During operation of the internal combustion engine or when filling tank 10, volatile hydrocarbon vapors are formed in the tank and pass through line 12 to enter activated carbon filter 14, where they are reversibly bound in a known way.

In the case of fuel-tank venting valve 20, which is triggered to open temporarily by a control unit 21 via a first electric control line 40, and reversing valve 32, which is triggered correspondingly by a second control line 42, ambient fresh air 22 is then drawn in and passed through activated carbon filter 14, so that any fuel stored therein is released to the intake air, the result being regeneration of activated carbon filter 14.

To diagnose tank 10 or the entire tank system for leaks, a leak diagnostic unit 28 is connected to activated carbon filter 14. Diagnostic unit 28 includes a vane pump 30. Reversing valve 32 mentioned above is connected upstream from pump 30. A reference leak 36 is introduced into a separate line branch 34. Reference leak 36 is opened and closed in this example by a magnetic slide valve 38. The particular dimensions of reference leak 36 are selected so that they correspond to the size of the leak to be detected. In the case of the U.S. standard cited above, the reference leak thus has an open cross section of 0.5 mm.

Reversing valve 32 has two positions. In the first position, pump 30 is connected to tank 10 in a pressure-conducting manner via activated carbon filter 14 and thus it pumps outside air into tank 10. While fresh air is being pumped into tank 10, the power consumption of pump 30 is being determined continuously. To perform a reference measurement, reversing valve 32 is closed completely so that the power consumption of pump 30 is then detectable via magnetic sliding valve 38 on the basis of the dynamic pressure built up upstream from reference leak 36. Triggering of pump 30 via control unit 21 and readout of the power consumption data are performed via corresponding control lines and data lines 44, 46.

Figure 2:
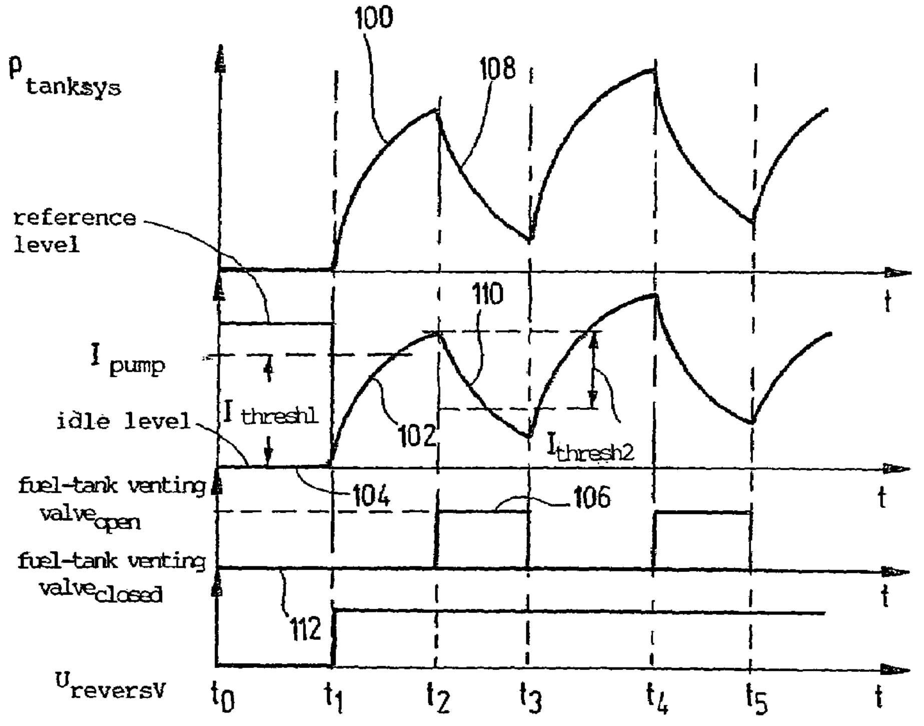
FIG. 2 shows control signals supplied according to a first exemplary embodiment and measurement data derived thereby as a function of time.
Figure 3:
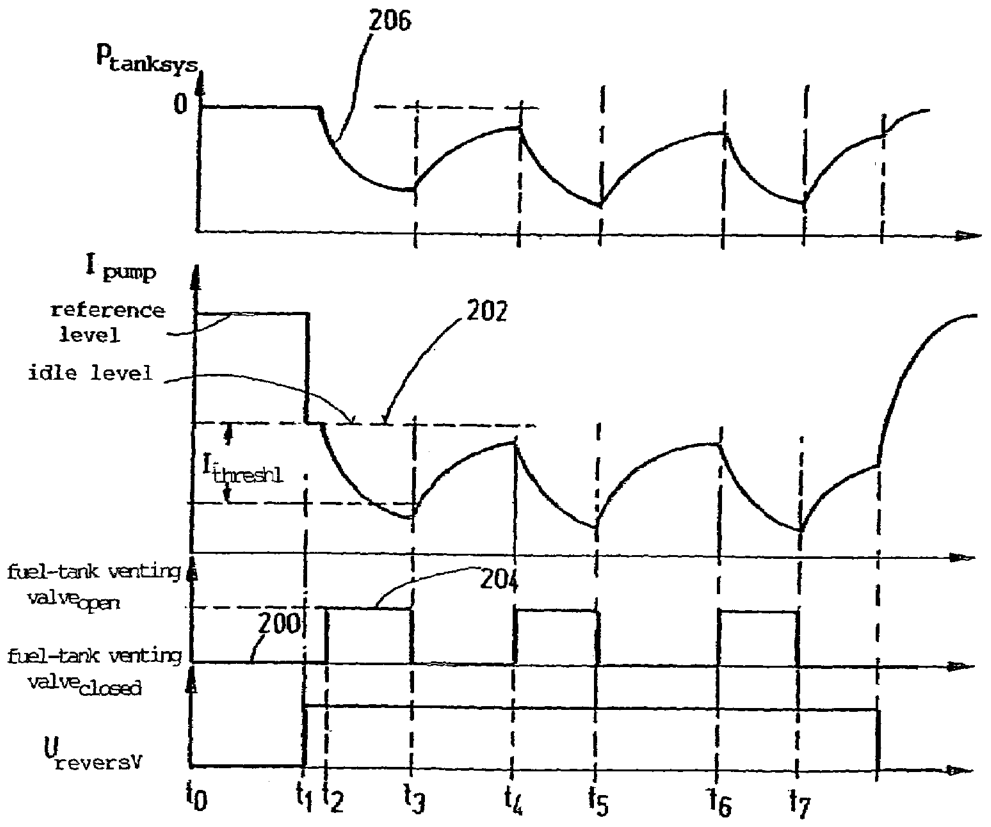
FIG. 3 shows a diagram corresponding to FIG. 2 according to a second exemplary embodiment.

FIGS. 2 and 3 show curves of control voltage U_ReversV of reversing valve 32, triggering of fuel-tank venting valve 20, the pump current, i.e., pump power consumption I_pump and the pressure in the tank system p_Tanksys over time, such as those which occur in two different embodiments of the method according to the present invention.

As shown in FIG. 2, an excess pressure 100 is generated in the tank system after voltage U_ReversV is supplied to reversing valve 32 at t1 and fuel-tank venting valve 20 is triggered to close by pump 30. Power consumption 102 of pump 30 also rises because of the back-pressure that develops and is detected continuously or discretely in short intervals. If power consumption 102 increases starting from idle current 104 by a first threshold value I_Thresh1 which is to be determined empirically in advance, then a correctly closing fuel-tank venting valve 20 is determined from pressure buildup 100 in the tank system which correlates with the power consumption. It is possible here to assume there is at least one fuel-tank venting valve 20, which is thus opened beneath a diagnostic threshold and is no longer to be regarded as minimal despite the fact that it is triggered to close.

Fuel-tank venting valve 20 is then triggered to open 106 at t2, which results in a pressure drop 108 in the tank system when fuel-tank venting valve 20 is actually opened, and thus results in a decline 110 in the power consumption of pump 30. Correct opening of fuel-tank venting valve 20 is determined when the absolute value of this drop exceeds a second threshold value I_Thresh2, which is also to be determined empirically.

The cycle of pressure buildup 100 and pressure drop 108 described above with fuel-tank venting valve 20, which is triggered to be closed 112 and opened 106, may be repeated multiple times to increase the quality of the function diagnosis, as shown in this example. There is thus a second pressure increase here between t3 and t4 and subsequently another pressure drop between t4 and t5.

To also permit a quantitative differentiation between correct and incorrect functioning of fuel-tank venting valve 20, fuel-tank venting valve 20 may also be triggered to open using different pulse duty factors to allow, e.g., calculation of the actual mass flow, i.e., volume flow passing through fuel-tank venting valve 20 by detecting the gradient of power consumption I_pump of pump 30 over time. It is known that it is possible to make use of the relationship: DELTA_V/DELTA_t is proportional to DELTA_p/DELTA_t, and DELTA_p/DELTA_t is in turn proportional to DELTA_I/DELTA_t (where V=volume flow, p=pressure, I=power consumption, t=time).

FIG. 3 shows a second exemplary embodiment in a diagram similar to that in FIG. 2, in which diagnosis of the fuel-tank venting valve is performed by a vacuum method, in contrast with FIG. 2. In the case of fuel-tank venting valve 20, which is initially triggered 200 to close, pump 30 is activated briefly and its power consumption I_pump is detected under idle conditions 202. At t2, fuel-tank venting valve 20 is triggered 204 to open, so that because of the existing intake manifold vacuum, during the actual opening of fuel-tank venting valve 20 a pressure drop 206 is established in the tank system. After renewed closing of fuel-tank venting valve 20 at t3 and renewed activation of pump 30, the functional reliability of fuel-tank venting valve 20 is determined from the difference between detected idle current 202. In this exemplary embodiment, the cycles are also repeated multiple times and, as described above, different pulse duty factors may also be used, if necessary.

The method steps described above for diagnosis of fuel-tank venting valve 20 may be implemented through corresponding programming of control unit 20, e.g., by introducing a corresponding program code into an EEPROM.

What is claimed is:

1. A method for testing functional reliability of a fuel-tank venting valve situated in a motor vehicle tank system which is connected to an intake manifold and is triggerable by a control unit, a pressure source being provided for testing the tank system for leaks by using excess pressure or a vacuum, the method comprising:

a) triggering the fuel-tank venting valve to open or close to implement a change in pressure;

b) detecting at least one electric performance quantity of the pressure source; and c) determining one of a proper opening operation or a proper closing operation of the fuel-tank venting valve from one of: i) the at least one electric performance quantity detected, or ii) a change in the at least one electric performance quantity detected.

2. The method as recited in claim 1, wherein the triggering step includes triggering the fuel-tank venting valve to close, the pressure building up in the fuel-tank venting system by the pressure source, and wherein after the determining step, the method further comprising:

subsequently triggering the fuel-tank venting valve to open so that a resulting pressure drop occurs;

detecting the at least one electric performance quantity of the pressure source; and determining a properly opening fuel-tank venting valve from the detected electric performance quantity.

3. The method as recited in claim 1, wherein the triggering step includes triggering the fuel-tank venting valve to open so that a pressure drop in the fuel-tank venting system occurs, and wherein after the determining step, the method further comprising:

subsequently triggering the fuel-tank venting valve to close so that a resulting pressure buildup occurs;

detecting the at least one electric performance quantity of the pressure source; and determining a properly closing fuel-tank venting valve from the detected electric performance quantity.

4. The method as recited in claim 1, wherein the at least one electric performance quantity is detected during idling of the pressure source, and the functional reliability of the fuel-tank venting valve is determined from a relative change in the electric performance quantity with respect to the idle performance quantity.

5. The method as recited in claim 1, wherein the triggering step includes triggering the fuel-tank venting valve to close, and briefly activating the pressure source, wherein the at least one electric performance quantity is detected while the pressure source is idling to provide an idle performance quantity, and wherein the method further comprises:

subsequently triggering the fuel-tank venting valve to open; and determining the functional reliability of the fuel-tank venting valve from a relative change in the at least one electric performance quantity of the pressure source with respect to the idle performance quantity.

6. The method as recited in claim 1, the functional reliability of the fuel-tank venting valve is determined when the at least one electric performance quantity of the pressure source exceeds or drops below a predetermined threshold value.

7. The method as recited in claim 1, wherein the step a) is performed at least twice to achieve at least two changes in pressure, before steps b) and c).

8. The method as recited in claim 7, wherein the at least two changes in pressure each occur at a different pulse duty factor, and a quantitative functional performance of the fuel-tank venting valve is determined from a gradient of the change in the at least one electric performance quantity of the pressure source.

9. A control unit for testing functional reliability of a fuel-tank venting valve situated in a motor vehicle tank system which is connected to an intake manifold, a pressure source being provided for testing the tank system for leaks by using pressure or vacuum, the control unit comprising:

an arrangement configured to trigger the fuel-tank venting valve to open or close to implement a change in pressure;

an arrangement configured to detect at least one electric performance quantity of the pressure source; and an arrangement configured to determine one of a proper opening operation or a proper closing operation of the fuel tank venting valve from one of: i) the at least one electric performance quantity, or ii) a change in the at least one electric performance quantity detected.

10. A tank leakage diagnostic device, comprising:

a pressure source for testing a motor vehicle tank system for leaks by using pressure or vacuum; and a control unit configured to trigger a fuel-tank venting valve to open or close to implement a change in pressure, detect at least one electric performance quantity of the pressure source, and to determine one of a proper opening operation or a proper closing operation of the fuel-tank venting valve from one of: i) the at least one electric performance quantity, or ii) a change in the at least one electric performance quantity detected.

* * * * *